(12) United States Patent
Voorhees

(10) Patent No.: US 11,707,704 B2
(45) Date of Patent: Jul. 25, 2023

(54) RAG SEEDING IN WASTEWATER TREATMENT SYSTEMS

(71) Applicant: Ovivo Inc., Montreal (CA)

(72) Inventor: Dustin Voorhees, Buda, TX (US)

(73) Assignee: Ovivo Inc., Montreal (CA)

(*) Notice: Subject to any disclaimer, the term of this patent is extended or adjusted under 35 U.S.C. 154(b) by 156 days.

(21) Appl. No.: 17/175,451

(22) Filed: Feb. 12, 2021

(65) Prior Publication Data

US 2021/0252435 A1  Aug. 19, 2021

Related U.S. Application Data

(60) Provisional application No. 62/977,029, filed on Feb. 14, 2020.

(51) Int. Cl.
| | | |
|---|---|---|
| *B01D 29/48* | (2006.01) | |
| *B01D 29/56* | (2006.01) | |
| *B01D 29/60* | (2006.01) | |
| *B01D 37/04* | (2006.01) | |
| *B01D 39/16* | (2006.01) | |
| *C02F 1/00* | (2023.01) | |
| *C02F 101/30* | (2006.01) | |

(52) U.S. Cl.
CPC ............ *B01D 29/48* (2013.01); *B01D 29/56* (2013.01); *B01D 29/605* (2013.01); *B01D 37/045* (2013.01); *B01D 39/16* (2013.01); *C02F 1/001* (2013.01); *C02F 1/008* (2013.01); *C02F 2101/30* (2013.01); *C02F 2201/006* (2013.01); *C02F 2209/42* (2013.01); *C02F 2303/14* (2013.01)

(58) Field of Classification Search
CPC .... B01D 29/48; B01D 29/605; B01D 37/045; C02F 1/001; C02F 2303/14
See application file for complete search history.

(56) References Cited

U.S. PATENT DOCUMENTS

| | | | | |
|---|---|---|---|---|
| 5,587,067 A | * | 12/1996 | Love | C02F 9/00 210/162 |
| 2009/0314722 A1 | * | 12/2009 | Kelly | B01D 33/807 210/744 |
| 2017/0348620 A1 | * | 12/2017 | Rastegar | C02F 1/44 |

FOREIGN PATENT DOCUMENTS

| | | | | |
|---|---|---|---|---|
| CN | 109095633 A | * | 12/2018 | ............ C02F 9/00 |
| CN | 110563277 A | * | 12/2019 | |

OTHER PUBLICATIONS

Shen W—CN-110563277-A machine translation—Dec. 2019 (Year: 2019).*

(Continued)

*Primary Examiner* — Bradley R Spies
(74) *Attorney, Agent, or Firm* — Thomas M. Freiburger

(57) ABSTRACT

In a wastewater treatment plant a rag seeding tank is included in a process drain to collect hair and fibers which have passed through headworks of the plant. The hair and fibers tend to join together into large masses downstream of the headworks and can be damaging to process zones, particularly membrane zones. The rag seeding tank includes cartridges filled with surfaces that fibers and hair will attach to, so that hair/fiber rags grow in the seeding tank and are removed therefrom rather than causing problems downstream.

9 Claims, 3 Drawing Sheets

(56) References Cited

OTHER PUBLICATIONS

Huz—CN-109095633-A machine translation—Dec. 2018 (Year: 2018).*
Liz, "Does the Cora Ball Capture Plastic Microfibres?", print of URL: facedownwaste.com/does-the-cora-ball-capture-plastic-microfibres/, Aug. 28, 2018, 3 pages.

* cited by examiner

RAG SEEDING IN WASTEWATER TREATMENT SYSTEMS

This application claims benefit of provisional application Ser. No. 62/977,029, filed Feb. 14, 2020.

BACKGROUND OF THE INVENTION

This invention concerns wastewater treatment systems, and more particularly, abatement of ragging in process zones.

Ragging has always been a problem for wastewater treatment plants. Ragging is the accumulation of single hairs and fibers that can easily pass through headworks and join together downstream into large masses in various areas of the plant. The rags can be very damaging to sensitive processes and equipment of the plant, particularly in membrane zones. In a conventional solution to ragging, treatment plants use a process known as re-screening, by which mixed liquor is pumped back from one or more process zones through screens at the head of the plant. Since most screens for trapping rags are not made to process mixed liquor, this reduces the capacity of screens and causes a need for increased maintenance. Typically rescreening is done intermittently, so it cannot eliminate the problem.

SUMMARY OF THE INVENTION

The invention reduces ragging in sensitive areas of a plant by encouraging or "seeding" ragging in an area where it can be controlled and managed. The need for re-screening at the headworks is eliminated, by implementation of a tank made strictly for removing hair and fiber, which can be a twenty-four hour process. In one implementation the tank is designed as part of the RAS process. Otherwise the rag seeding tank can be a stand alone process to target individual basins, or it can even be placed immediately after typical headworks, to capture hair and fiber (collectively referred to as fiber) before the screened influent enters the plant.

The general purpose of the rag seeding tank is to collect hair and fibers in one easily accessible area before they have a chance to cause damage. This makes removal of the damaging hair/fibers very simple without the need for draining a basin. The system acts somewhat like an air conditioning filter, but water, and for individual fibers rather than dust particles. In one particular embodiment the tank has cartridges filled with a surface or surfaces that fibers are encouraged to attach themselves to. Once a few hairs and fibers become connected they seem to tangle up with other massing hair and fibers which slowly build up to what is called a rag. These rags continually grow as more fibers are tangled up in the mass. The invention provides a surface or "seeds" to encourage rags to grow in an area that will not cause damage to the rest of the plant.

As the rags build up on this rag seeding surface, the mass can simply be discarded and replaced with a new surface. The surface or seeds could possibly have the ability to be cleaned off and put back into the cartridge, without a need for replacement.

This seeding surface is designed to be configured with snagging elements, which in a preferred embodiment are something like a cocklebur (*xanthium strumarium*). This type of surface is designed for the sole purpose of attaching itself to hair and fibers. Instead of trying to minimize ragging, the ragging system of the invention causes the ragging to happen in one controlled area.

The seeding surfaces in the ragging zone can have fiber-gripping structures other than hook structures. For example wire brush surfaces, a network of barb wire, chicken wire, or other structures with rough surfaces that tend to grip fibers can be used.

Most methods for rag reduction use equipment simply not made for capturing single hair and fibers. They depend on these fibers joining together in the plant first and becoming a mass large enough to be pumped back to the headworks and removed by typical screens. This process can be expected only to mildly reduce ragging. It is rarely a continuous process and is unreliable.

The method of the invention can be done continuously without the need for expensive equipment or costly changes to the wastewater treatment plant. It can be adapted to currently operating plants, or designed in as a process for a new plant. It can also have one or several stages of filtration.

An object of the invention is to efficiently capture hair and fibers that cause ragging in a sewage treatment plant, without re-screening at the head of the plant. These and other objects, advantages and features of the invention will be apparent from the following description of a preferred embodiment, considered along with the accompanying drawings.

DESCRIPTION OF PREFERRED EMBODIMENTS

Figure 1:
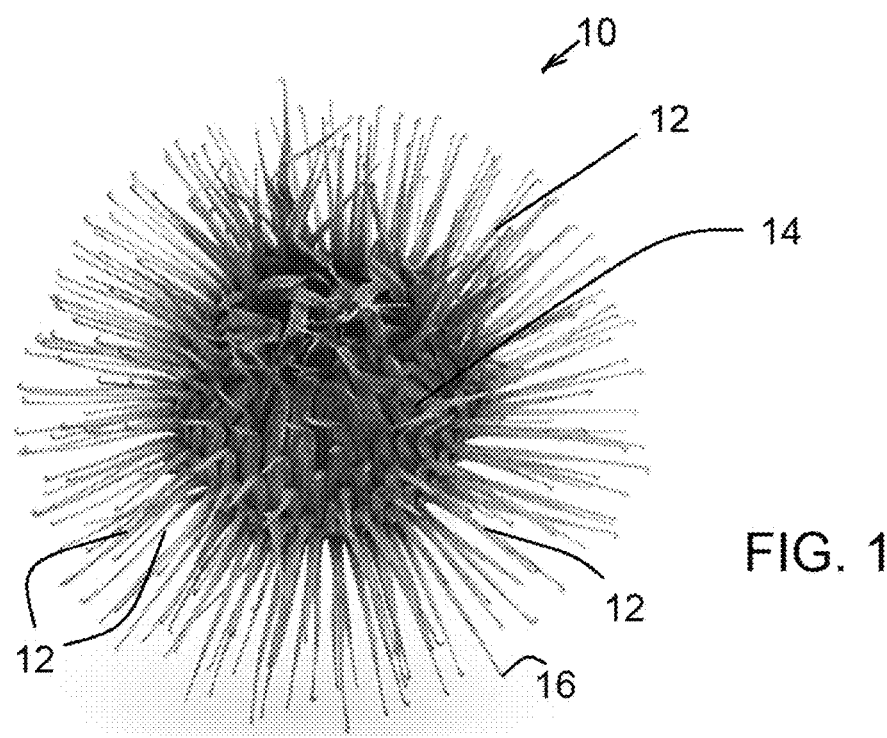
FIGS. 1 and 2 are views showing naturally-occurring burrs, for example, a cocklebur, with the enlarged image of FIG. 2 showing hooks on the burr tips that are highly effective in attaching themselves to hair, fibers, pieces of fabric, etc.
Figure 2:
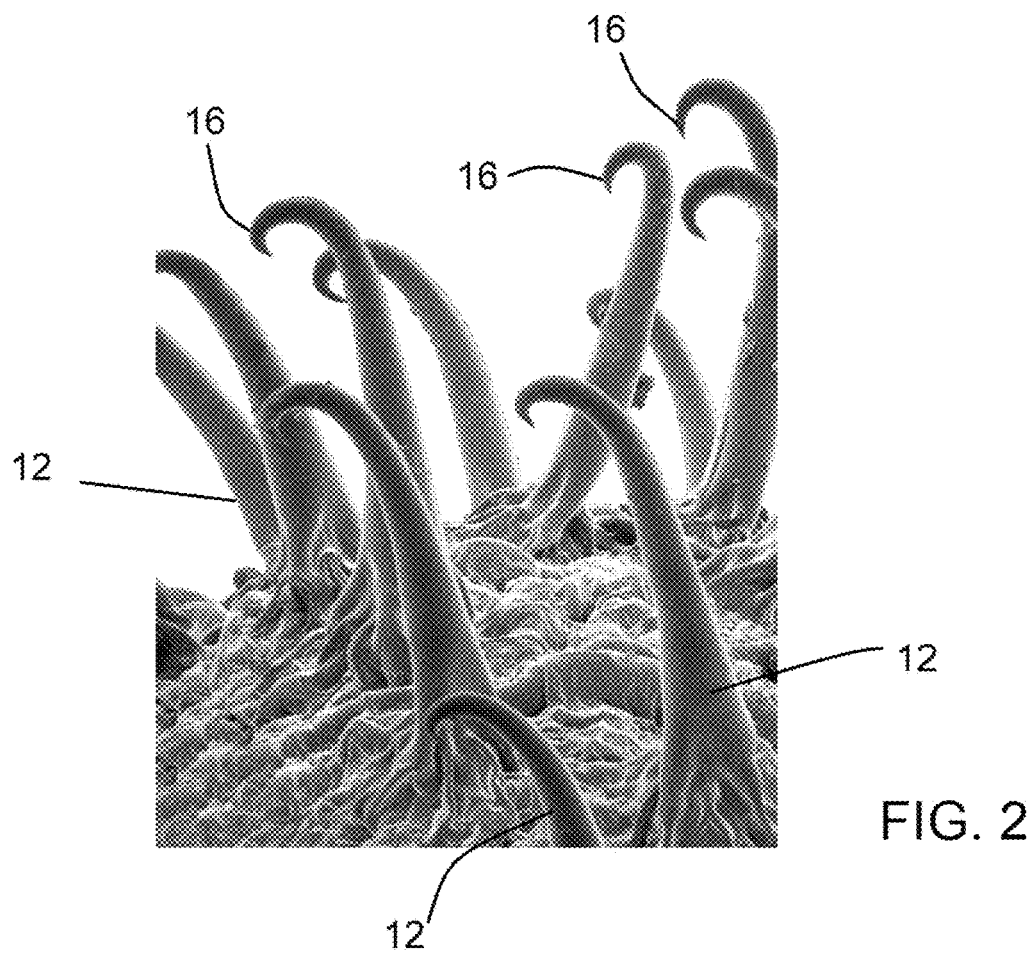

In the drawings, FIGS. 1 and 2 show a naturally-occurring burr, which may be the species known as a cocklebur (*xanthium strumarium*). The burr 10 has hundreds of shafts 12 extending radially out from a central body 14, and each shaft terminates in a hook 16. The hooks 16 are better illustrated in the detail view of FIG. 2. These burrs with hooked tips are naturally designed to grip onto hair or fur of animals, and they are difficult to remove. They also grip many fabrics quite effectively. These naturally occurring burrs 10, or structures like them with hooks, can be used as rag "seeds", to collect hairs, fibers and partially formed rags if contained in a filter-like structure through which wastewater or RAS will pass. By a "hook" or "barb" is meant an extending shaft structure with an outer end that curves or bends through at least 90°. A shaft could be manufactured to support more than one hook.

Figure 3:
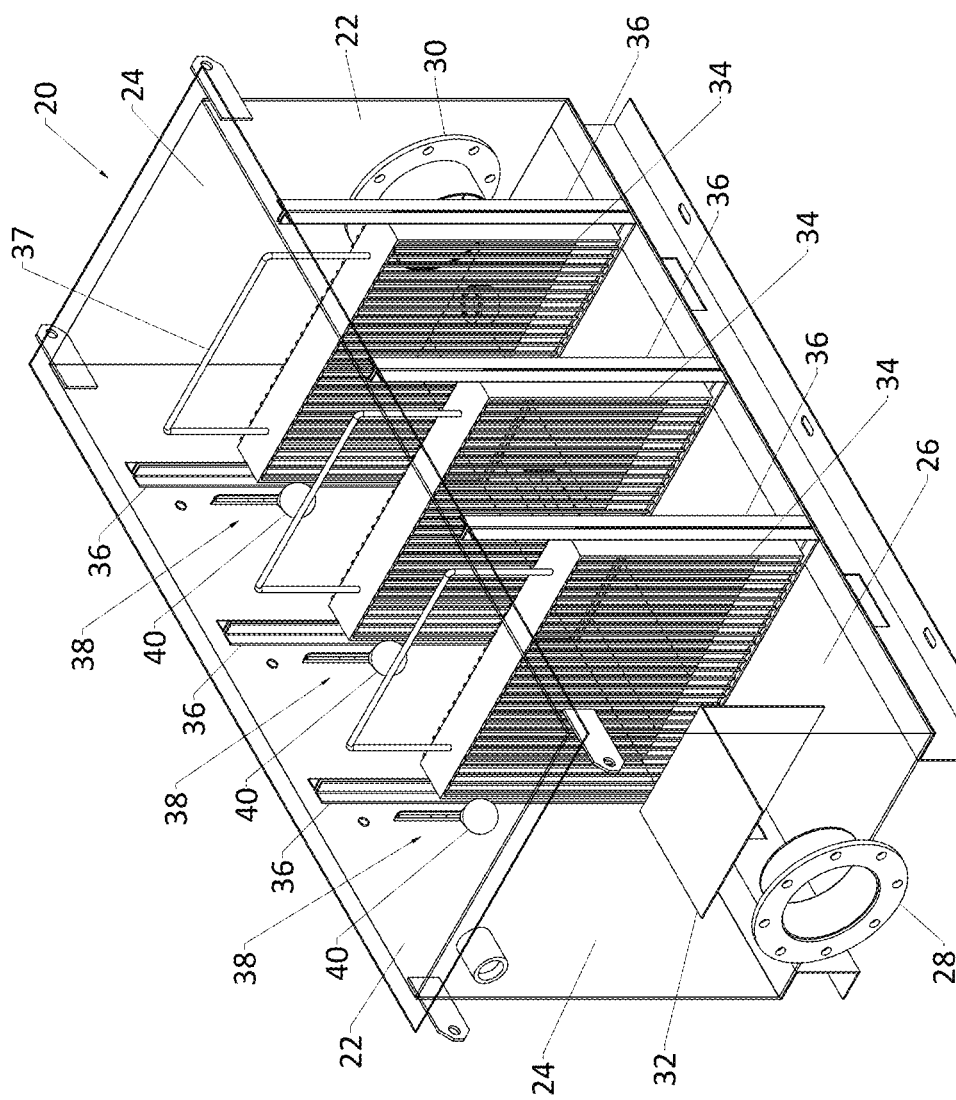
FIG. 3 is a schematic view in perspective, showing a rag seed tank in one implementation of the invention. Walls of the tank are shown transparent to reveal internal structure.

FIG. 3 shows schematically, in perspective, a rag seeding tank 20 of the invention. The tank, which can be rectangular with vertical walls 22 and 24 and a floor 26, has an intake 28 and an outlet 30. Plant water enters through the intake 28.

Preferably a baffle 32 is positioned just inside the tank near the intake 28, to slow and disperse the inflow and spread it essentially throughout the cross section of the flow through the tank, to the right as viewed in FIG. 3. The baffle preferably has a shape to encourage circular flow to cause a component of lateral flow on approach to the first filter, thus encouraging snagging of hairs and fibers on the barbs or seeds.

Within the tank are a series of filter cartridges 34 arranged in series, as a series of stages, parallel and spaced apart with respect to one another as shown. Each of the filter cartridges 34 is configured to contain a multiplicity of ragging seeds. Each stage could be formed of multiple cartridges side-by-side or stacked in a single plane if desired. At each stage the rag seed surface captures single hairs and fibers, and including any hair or fibers already amassed together. Each cartridge can be lifted out of the tank when ragging has eventually reached the point that the filters are clogged and flow through the tank has been greatly reduced, e.g. to the extent the liquid flows over the top of a filter. FIG. 3 shows that in this preferred embodiment the edges of these single cartridges engage with vertically disposed tracks 36 at opposed positions on walls 22 of the tank. The tracks hold the cartridges in place in service and allow for orderly lifting and removal of the cartridges, via access points 37 above the water levels for servicing the filters.

Also shown in the drawing are liquid level switches 38, each including a float 40, to sense liquid level and to activate the switch when the level reaches a particular height indicating slow down of movement through the filter cartridges that has caused the rise in level. As the fibers build up into rags they will slowly block the entire filter. As the filter blinds off the water will rise up and over the first stage of filtration and continue to the next stage. When that happens the level switch will send an alarm letting the operator know that the stage one filter is blinded off and in need of replacement or cleaning. The following stages will do the exact same thing, in succession. Even if all filters were to become clogged, the water will simply continue on to the discharge point and continue operating as plants do today, with no risk of overflowing the tank itself.

Figure 4:
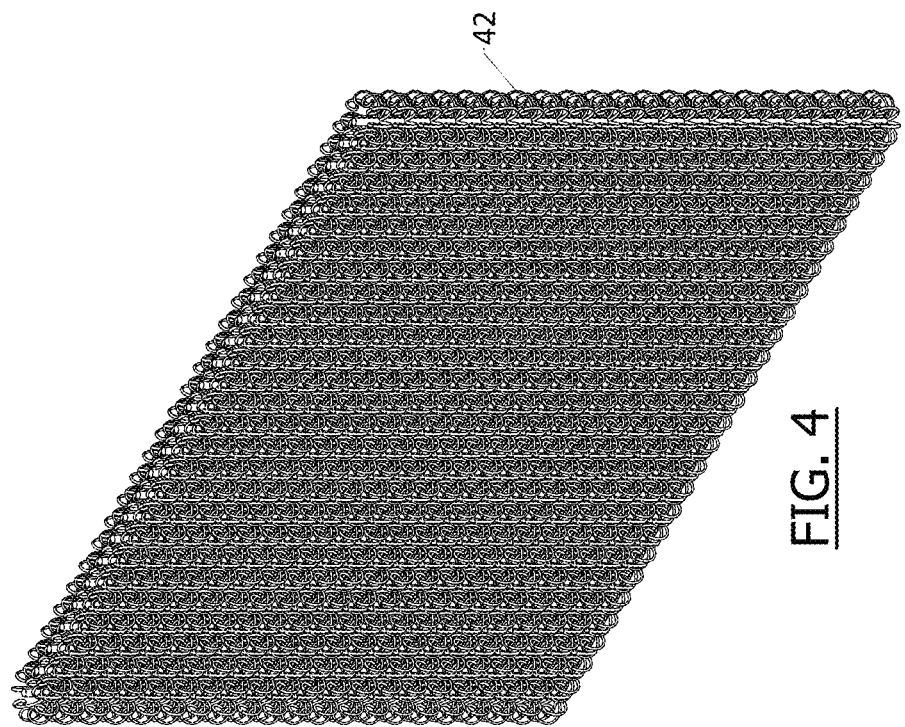
FIG. 4 is a perspective view showing a mat according to the invention, providing a surface with a multiplicity of hooked hair-engaging structures.
Figure 5:
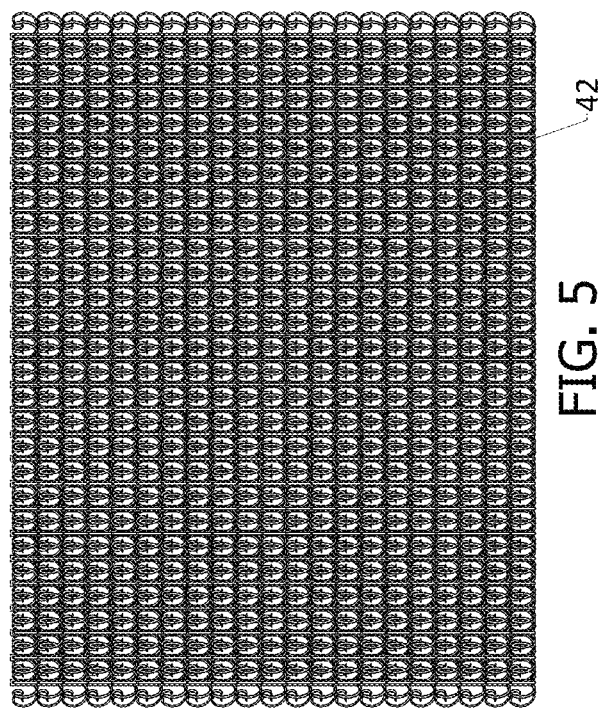
FIG. 5 is a plan view of a hair/fiber trapping mat as in FIG. 4.
Figure 6:
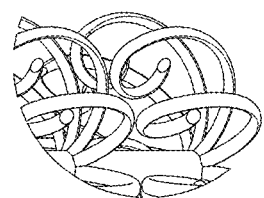
FIG. 6 is an enlarged detail view showing an example of rag seeding structures such as can be incorporated in the mat of FIGS. 4 and 5.

The seeds or hooks may be attached or incorporated within a mat 42, as shown in FIGS. 4 and 5. The mat can be formed of a plastic material that has surface barbs or hooks such as shown in FIG. 6, or the filter mat can be produced to have a multiplicity of shafts, each with multiple hooks. Manufacturing techniques such as used to produce VELCRO hook material can be employed, but with the mat being open for liquid flow. The filter device could be a container that holds a multiplicity of rag "seeds", e.g. small burr-like structures, the seeds bearing rags being removable from the cartridge when loaded with rags.

In one preferred embodiment with burr-like hook structures, the structures curve tightly through an approximate radius of 0.5 to 10 mm, or preferably a radius of no greater than 5 mm. Spacing of the hook structures or other fiber-gripping structures can vary, but in a preferred form of the cartridge or mat 42 the spacing between fiber-gripping structures is in a range of about 5 to 20 mm, preferably no greater than 20 mm and more preferably no greater than about 10 mm. As noted above, the fiber-gripping structures can be similar to wire brushes, barb wire, chicken wire, etc., so long as they tend to snag fibers. Wire bristles are more effective if angled such that the bristles are not aligned with liquid flow. Individual wires of a wire brush surface should be spaced apart, a few millimeters up to about 10-20 mm, so as not to catch a significant amount of solids. The wires could be on a planar surface or on curved surfaces such as rollers.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A wastewater treatment plant for domestic wastewater, having a series of process zones, comprising:
    the plant including a ragging zone for removal of hair and fibers in the wastewater stream, such hair and fibers tending to gather together to produce rags in the process zones,
    the ragging zone including a cartridge in the flow stream containing a multiplicity of fiber-gripping structures to which substantially the entire flow of wastewater is exposed as the wastewater flows through the cartridge,
    the fiber-gripping structures comprising hook structures with outer ends that curve or bend through more than 90°, the fixed structures being spaced apart no more than 20 mm and having a radius in the range of about 0.5 to 10 mm, and
    wherein the ragging zone includes a series a stages, each with at least one cartridge through which the flow stream penetrates, such that if a cartridge or cartridges of a first stage become blocked, the flow stream will overflow the cartridge and pass through the next stage, the cartridges being removable and replaceable,
    whereby the hair and fibers carried in the wastewater are caused to rag together on the fiber-gripping structures of the cartridges, so that the cartridges can be removed and changed as needed and fouling of the process zones by ragging is eliminated.

2. A wastewater treatment plant as in claim 1, wherein the ragging zone is a part of one of the process zones.

3. A wastewater treatment plant as in claim 1, wherein the ragging zone stands as a separate zone upstream of at least some of the process zone.

4. A wastewater treatment plant as in claim 1, wherein the outer ends of the hook structures curve through at least 180°.

5. A wastewater treatment plant as in claim 1, wherein the outer ends of the hook structures curve according to a radius no greater than about 5 mm.

6. A wastewater treatment plant as in claim 1, wherein the fiber-gripping structures are spaced apart no greater than about 10 mm.

7. A wastewater treatment plant as in claim 1, wherein each stage includes a liquid level indicator to indicate to an operator that the level in the stage has risen to overflow the cartridge, and thus a cartridge has become clogged and needs replacement.

8. A wastewater treatment plant as in claim 1, with a series of said cartridges, each being replaceable when clogged.

9. A wastewater treatment plant as in claim 1, wherein the hook structures comprise natural burs from plants.

* * * * *